US008605117B2

(12) United States Patent
Kim et al.

(10) Patent No.: US 8,605,117 B2
(45) Date of Patent: Dec. 10, 2013

(54) METHOD AND APPARATUS FOR PROVIDING CONTENT

(75) Inventors: Cory Kim, Gyeonggi-do (KR);
Jae-young Lee, Gyeonggi-do (KR);
Hyung-jin Seo, Gyeonggi-do (KR);
Sung-hyun Cho, Seoul (KR); Jong-eun Yang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 415 days.

(21) Appl. No.: 12/871,381

(22) Filed: Aug. 30, 2010

(65) Prior Publication Data

US 2011/0050707 A1    Mar. 3, 2011

(30) Foreign Application Priority Data

Aug. 28, 2009    (KR) .................. 10-2009-0080722

(51) Int. Cl.
*G09G 5/00*    (2006.01)

(52) U.S. Cl.
USPC .............................................. 345/660; 482/7

(58) Field of Classification Search
USPC ............................................. 345/660; 482/7
See application file for complete search history.

(56) References Cited

U.S. PATENT DOCUMENTS

| 5,204,946 | A | * | 4/1993 | Shimamura | 715/223 |
| 5,289,168 | A | * | 2/1994 | Freeman | 345/672 |
| 5,586,196 | A | * | 12/1996 | Sussman | 382/114 |
| 5,742,264 | A | * | 4/1998 | Inagaki et al. | 345/8 |
| 7,224,282 | B2 | * | 5/2007 | Terauchi et al. | 340/573.1 |
| 7,290,212 | B2 | * | 10/2007 | Fushimi et al. | 715/731 |
| 7,544,880 | B2 | * | 6/2009 | Takai et al. | 84/612 |
| 7,548,415 | B2 | * | 6/2009 | Kim | 361/679.27 |
| 8,116,576 | B2 | * | 2/2012 | Kondo | 382/236 |
| 2002/0057281 | A1 | * | 5/2002 | Moroo et al. | 345/668 |
| 2006/0161565 | A1 | * | 7/2006 | Ko et al. | 707/100 |
| 2006/0243120 | A1 | * | 11/2006 | Takai et al. | 84/612 |
| 2007/0273714 | A1 | * | 11/2007 | Hodge et al. | 345/690 |
| 2008/0068335 | A1 | * | 3/2008 | Arakawa et al. | 345/156 |
| 2009/0024415 | A1 | * | 1/2009 | Alpert et al. | 705/3 |
| 2009/0040231 | A1 | * | 2/2009 | Sano et al. | 345/474 |
| 2010/0188426 | A1 | * | 7/2010 | Ohmori et al. | 345/660 |

* cited by examiner

*Primary Examiner* — Maurice L McDowell, Jr.
(74) *Attorney, Agent, or Firm* — The Farrell Law Firm, P.C.

(57) ABSTRACT

A method and apparatus for providing content to user that is moving. The method includes obtaining movement information or bio-information about a user, processing content based on the movement information or the bio-information, and outputting the processed content.

19 Claims, 17 Drawing Sheets

METHOD AND APPARATUS FOR PROVIDING CONTENT

PRIORITY

This application claims priority to Korean Patent Application No. 10-2009-0080722, filed on Aug. 28, 2009, in the Korean Intellectual Property Office, the disclosure of which is incorporated herein in its entirety by reference.

BACKGROUND OF THE INVENTION

1. Field of the Invention

The present invention relates to a method and apparatus for providing content, and more particularly, to a method and apparatus for providing content to a moving user.

2. Description of the Related Art

According to the development of the information communication technology, various types of content are provided through various routes. With so many available choices, a user is nearly always able to receive desired content regardless of time and place.

Due to an increase in the importance of time management, there is an increasing demand on a user who wants to perform two or more tasks at one time. Accordingly, there are increasing cases in which the user uses content while in motion, like when a user watches a television (TV) while exercising.

SUMMARY OF THE INVENTION

The present invention provides a method and apparatus for efficiently providing content to a moving user.

According to an aspect of the present invention, there is provided a method of providing content to a user that moves, the method including obtaining movement information or bio-information about the user; processing content based on the movement information or the bio-information; and outputting the processed content.

The movement information may include a speed of movement, a direction of the movement, or a type of movement.

The bio-information may include an electrocardiogram, a brain wave, a stress index, a bone density index, a body mass index, a calorie tracker, or body age.

The processing operation may include extracting a keyword from text data; and determining a magnification ratio for the keyword based on the movement information or the bio-information, and magnifying the keyword according to the magnification ratio.

The processing operation may also include dividing text data into a plurality of block data; and determining a magnification ratio for the plurality of block data based on the movement information or the bio-information, and magnifying the plurality of block data according to the magnification ratio.

The processing operation may include selecting a plurality content to be output from among content stored in one or more connected devices, based on movement information and/or bio-information; and controlling the plurality selected content to be sequentially output.

According to another aspect of the present invention, there is provided a content providing apparatus for providing content to a user in motion, the content providing apparatus including an information obtaining unit for obtaining movement information or bio-information about the user; a content processing unit for processing content based on movement information or bio-information; and an output unit for outputting the processed content.

BRIEF DESCRIPTION OF THE DRAWINGS

The above and other features and advantages of the present invention will become more apparent with a detailed description of several embodiments thereof, with reference to the attached drawings in which.

DETAILED DESCRIPTION OF THE PRESENT INVENTION

Hereinafter, the present invention will be described in detail by explaining several embodiments of the invention with reference to the attached drawings.

Figure 1:
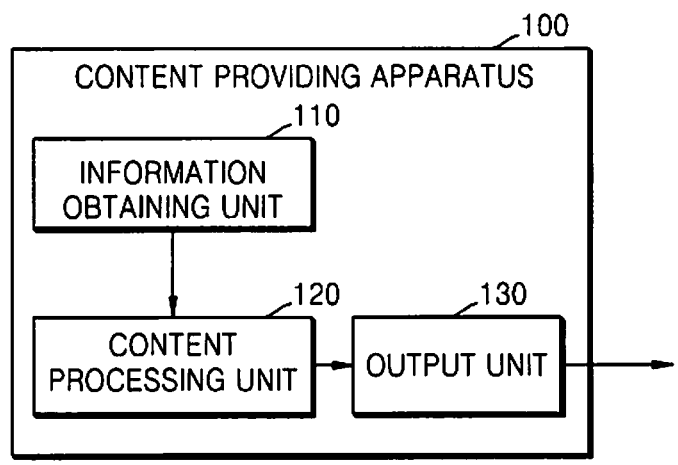
FIG. 1 is a block diagram illustrating a content providing apparatus according to an embodiment of the present invention.

FIG. 1 is a block diagram illustrating a content providing apparatus 100 according to an embodiment of the present invention. The content providing apparatus 100 may be applied to a case in which content is output to a moving user. For example, the content providing apparatus 100 may be applied to a case in which content is output to a user who is exercising.

The content providing apparatus 100 may include an information obtaining unit 110, a content processing unit 120, and an output unit 130.

The information obtaining unit 110 obtains movement information or bio-information about a user.

The movement information about the user may include any information related to the user's movement such as speed, direction, and type of movement. In particular, information about the type of movement indicates how the user moves, and includes information about what exercises the user is performing. The bio-information may include any information related to a physical state of the user, e.g., an electrocardiogram, a brain wave, a stress index, a bone density index, a body mass index, the amount of calorie consumption, body age, or the like.

In the case where a user watches content on a display device that is attached to (or separate from) a treadmill while the user runs on the treadmill, the information obtaining unit 110 may obtain movement information including running speed, pace, running direction, angle of inclination, exercise time, and the like. The information obtaining unit 110 may also obtain bio-information including heart rate, pulse frequency, the amount of calorie consumption, body age, and the like.

The content processing unit 120 processes content based on at least one of movement information and bio-information so as to allow the user to easily interpret the content. This is useful because the ability of a user to interpret the content is reduced, such that it is difficult for the user to understand the content. In particular, when the user views the content while running at a fast speed, the ability of the user to interpret the content is significantly reduced. Similarly, when the bio-information sharply changes, as in the case where the heart rate of the user rapidly increases, the ability of the user to interpret the content is greatly reduced. In one embodiment of the present invention, the content processing unit 120 appropriately processes the content according to at least one of movement information and bio-information so that the user may obtain information effectively while still allowing the user to stay in motion.

The output unit 130 outputs the processed content. The output unit 130 may adjust the speed at which the content is output, according to movement information and/or bio-information. For example, the output unit 130 may adjust the display speed of an image by outputting an image frame at a normal speed when the user runs slowly, and by outputting an image frame at a slow speed when the user runs rapidly.

FIGS. 2A through 6C illustrate methods of providing content to a moving user, according to several embodiments of the present invention. With reference to FIGS. 2A through 6C, it is assumed that a user is provided text data via a display device while the user runs on a treadmill. However, the present embodiment may also apply to other forms of content including a moving picture, a still image, music, or the like.

In addition, the way content is processed based on movement information will be described with reference to FIGS. 2A through 6C. However, the present embodiment may equivalently apply to a case in which the content is processed according to bio-information of the user.

Figure 2A:
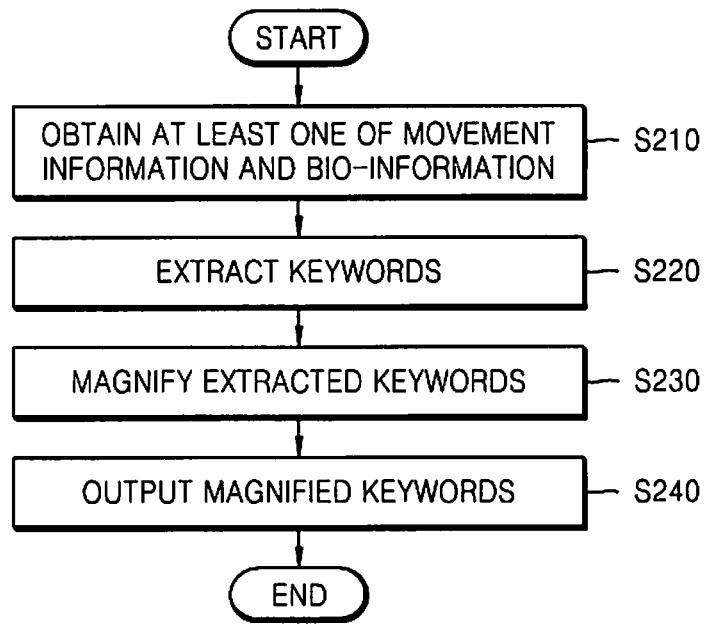
FIGS. 2A through 2C illustrate a method of providing content to a moving user, according to an embodiment of the present invention.
Figure 2B:
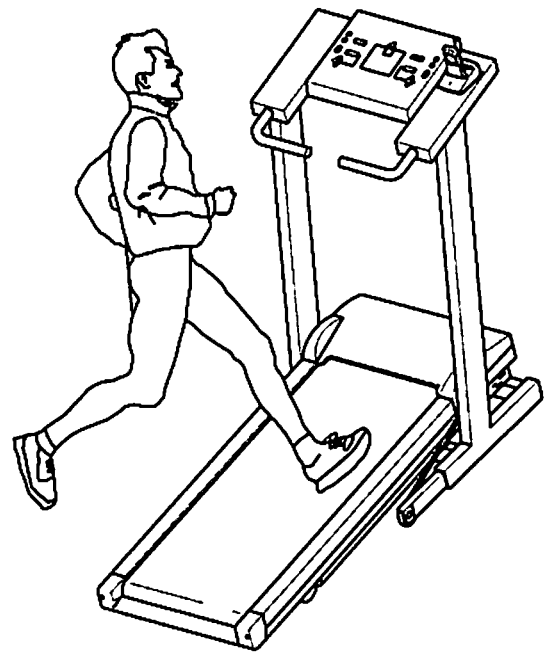
Figure 2C:
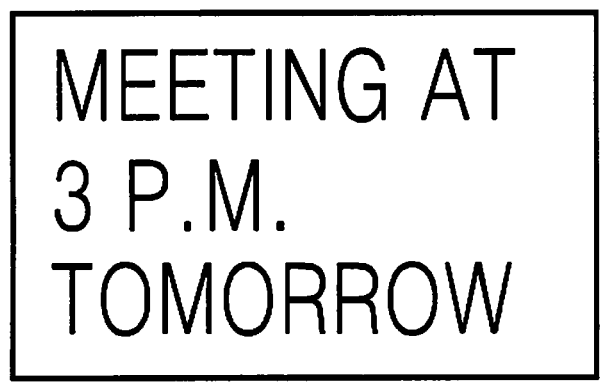
Figure 2C:

FIGS. 2A through 2C illustrate a method of providing content to a moving user, according to an embodiment of the present invention. According to the method described with reference to FIGS. 2A through 2C, only essential data from among a plurality of data configuring the content is magnified and displayed.

FIG. 2A is a flowchart illustrating the method of providing content according to an embodiment of the present invention.

In step S210, at least one of movement information and bio-information about the user is obtained. The movement information and the bio-information may be obtained from a sensor or the treadmill itself.

In step S220, keywords are extracted from the text data based on at least one of the movement information and bio-information. Here, the number of keywords that are extracted may be changed. That is, when the user runs slowly, a large number of keywords may be extracted, and when the user runs rapidly, a small number of keywords may be extracted. Since a user's content recognition ability is reduced when the user increases speed, more important keywords may be selectively extracted.

In step S230, the extracted keywords are magnified. A magnification ratio of the extracted keywords may be based on the movement information and/or the bio-information. For example, when the user runs at a speed of 5 km/h, the magnification ratio may be set to '2', and when the user runs at a speed of 10 km/h, the magnification ratio may be set to '4'.

In step S240, the magnified keywords are output. Here, the magnified keywords may be sequentially displayed, or the magnified keywords may be simultaneously output. Alternatively, only the magnified keywords may be output, or the complete text content could be output with the keywords magnified.

FIGS. 2B and 2C illustrate an example of the text data that is provided according to the method of FIG. 2A. FIG. 2B illustrates text data of a case where the user runs at a speed of 5 km/h, and FIG. 2C illustrates text data of a case where the user runs at a faster speed of 10 km/h.

In the case where the user runs at the slower speed of 5 km/h, four keywords corresponding to 'hello', 'meeting', 'tomorrow at 3 p.m.', and 'meeting' are extracted, and the extracted keywords are displayed at a magnification twice the size of the original text data. On the other hand, in the case where the user runs at the faster speed of 10 km/h, only two keywords corresponding to 'tomorrow 3 p.m.' and 'meeting' are extracted, and the extracted keywords are magnified four times larger than the original text data.

Figure 3A:
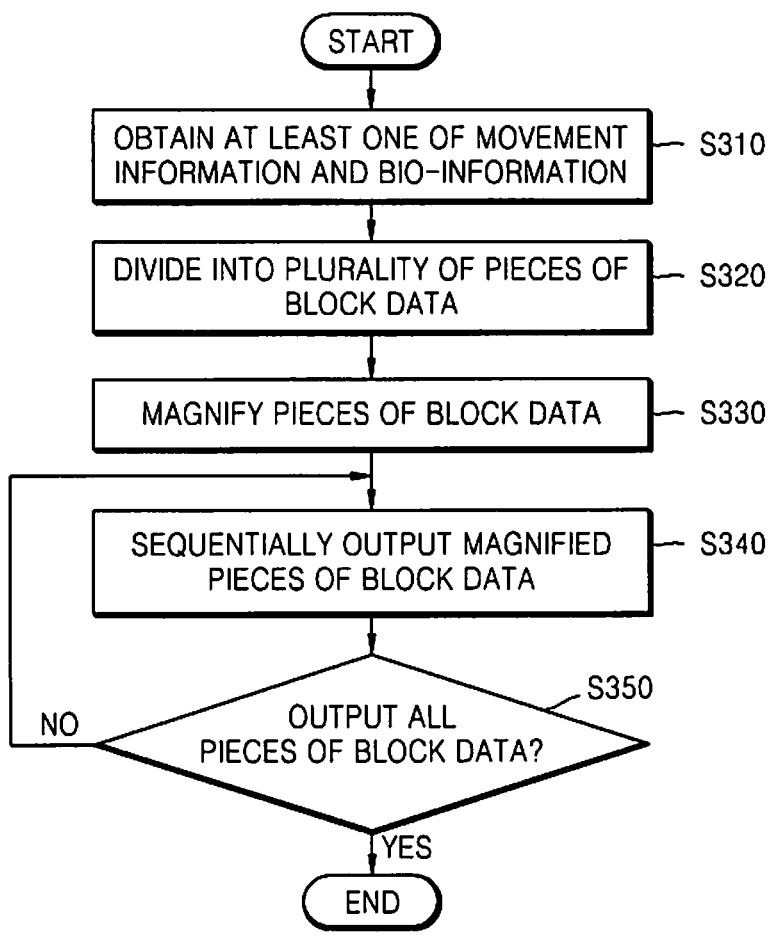
FIGS. 3A through 3C illustrate a method of providing content to a moving user, according to another embodiment of the present invention.
Figure 3B:
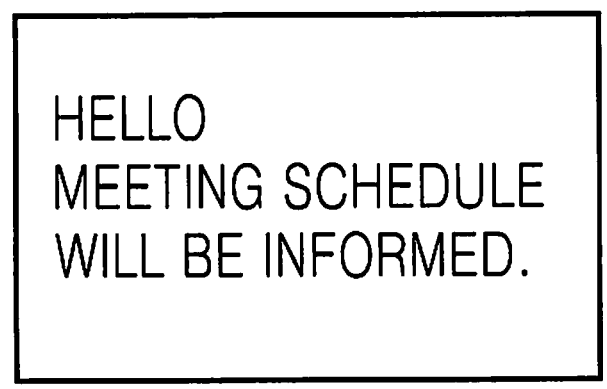
Figure 3B:
Figure 3C:
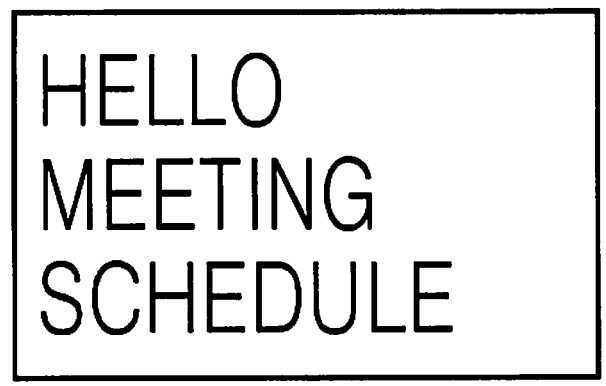
Figure 3C:
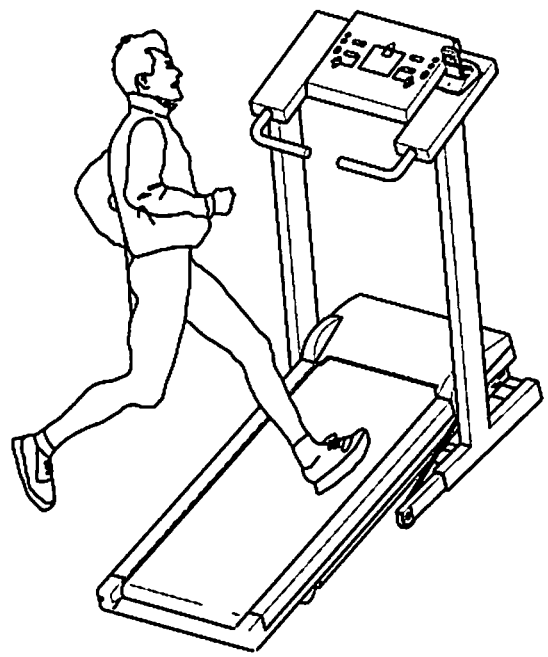

FIGS. 3A through 3C illustrate a method of providing content to a moving user, according to another embodiment of the present invention. According to the method described in FIGS. 3A through 3C, content is divided into a plurality of pieces of block data, which are magnified and output.

FIG. 3A is a flowchart illustrating the method of providing content according to an embodiment of the present invention.

In step S310, at least one of movement information and bio-information is obtained.

In step S320, text data is divided into a plurality of blocks. Hereinafter, for convenience of description, a plurality of pieces of data corresponding to the plurality of blocks will be referred to as a "plurality of pieces of block data."

In step S330, the plurality of pieces of block data is magnified.

In step S340, the plurality of pieces of magnified block data is sequentially output.

In step S350, it is determined whether the plurality of pieces of block data is all output, and if there is block data that is not output, step S340 is performed again.

When the text data is divided or when the plurality of pieces of block data is magnified and output, the dividing operation or the magnifying and outputting operation may be based on at least one of the movement information and bio-information.

While the magnification ratio of the plurality of pieces of block data may be uniformly determined regardless of a running speed of the user, the number of pieces of block data may be determined according to the running speed of the user. Alternatively, the number of pieces of block data may be uniformly determined regardless of the running speed of the user, but the magnification ratio of the plurality of pieces of block data may be determined in consideration of the running speed of the user.

FIGS. 3B and 3C illustrate an example of data that is provided according to the method described in relation to FIG. 3A. FIG. 3B illustrates a screen of a display device when the user runs at a slow speed of 5 km/h, and FIG. 3C illustrates a screen of a display device when the user runs at a faster speed of 10 km/h.

In FIG. 3B, when the user runs at the slower speed, text data is divided into two pieces of block data. When the text data is comprised of four lines, the upper two lines are divided into one block data, and the lower two lines are divided into the other block data. The block data is magnified twice bigger than original text data.

Referring to FIG. 3C, when the user runs at the faster speed, the text data is divided into four pieces of block data. When the text data is comprised of four lines, each of the four lines is divided into each of the four pieces of block data. The block data is magnified four times the size of the original text data.

Figure 4A:
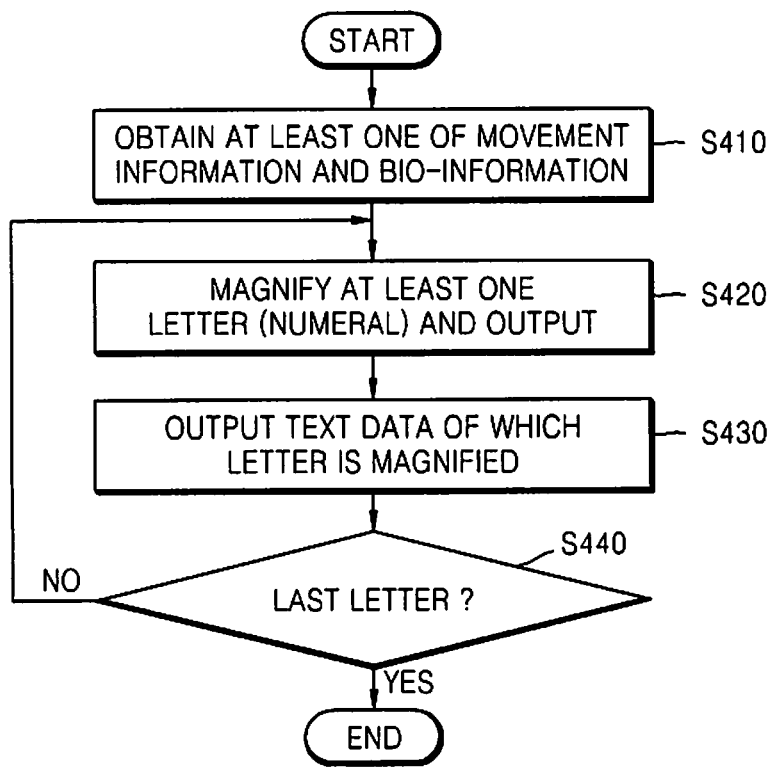
FIGS. 4A through 4C illustrate a method of providing content to a moving user, according to another embodiment of the present invention.
Figure 4B:
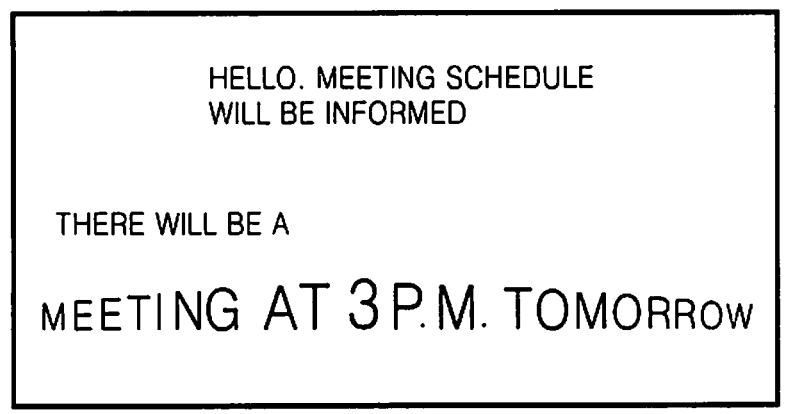
Figure 4B:
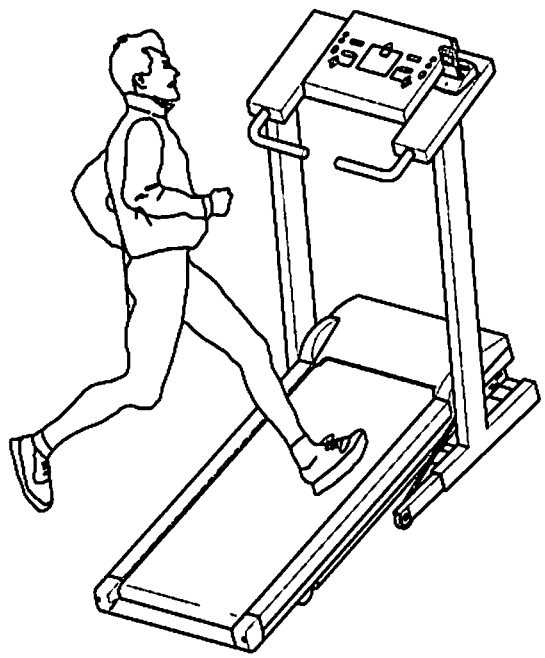
Figure 4C:
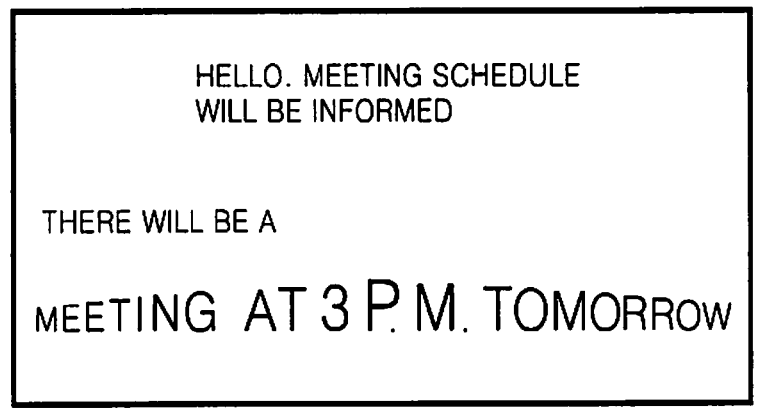
Figure 4C:

FIGS. 4A through 4C illustrate a method of providing content to a moving user, according to another embodiment of the present invention.

According to the method described with reference to FIGS. 4A through 4C, a portion in the content is magnified and output in such a manner that a magnified portion is sequentially changed.

FIG. 4A is a flowchart illustrating the method of providing content according to an embodiment of the present invention.

In step S410, at least one of movement information and bio-information is obtained.

In step S420, at least one letter, numeral, or word in the text data is magnified. Here, a target letter (or target numeral) is maximally magnified, and sizes of letters may be gradually decreased as the letters move farther from the target letter.

The number of letters to be magnified, the magnification ratio, and the interval by which a magnification target letter is changed may be determined based on at least one of the movement information and the bio-information. To be more specific, in the case where a user runs at a rapid speed, the magnification ratio may be increased, or the interval by which the magnification target letter is changed may be set to have a longer duration time. On the other hand, where the user runs at a slow speed, the magnification ratio may be decreased, or the interval by which the magnification target letter is changed may be set to a shorter duration time.

In step S430, magnified text data is output.

In step S440, it is determined whether a magnified letter is the last letter in the text data. If it is not, then step S420 is performed so that a subsequent letter in the text data is magnified and output.

FIGS. 4B and 4C illustrate a display device on which text data is output according to the method that is described with reference to FIG. 4A. FIG. 4B illustrates the screen of the display device at, for example, a time of 3 seconds, and FIG. 4C illustrates the screen of the display device at, for example, a time of 3.1 seconds. In this figure, an interval by which a magnified letter is changed is 0.1 seconds, and the magnification ratio with respect to the target letter is 1:2. As letters increase in distance from the target letter by one letter, the magnification ratio to the letters is decreased by 1:0.1.

Referring to FIG. 4B, at the time of 3 seconds, the number '3' is output, magnified at twice its original size. The two letters 'T' and 'P' adjacent to the number '3' are output, magnified slightly less than the target letter, by 1.9 times their original sizes. Similarly, letters 'A' and 'M' that are distant from the number '3' by two letters are output, magnified by a factor slightly less, at 1.8 times their original sizes.

Referring to FIG. 4C, at the later time of 3.1 seconds, a letter 'P' is output by being magnified at twice its original size. The number '3' and the letter 'M' adjacent to the letter 'P' are output, magnified slightly less than the letter 'P' by 1.9 times their original sizes. In this manner, a position of the most magnified letter is changed and output.

Referring to FIGS. 4B and 4C, a magnified portion is changed in a unit of letters, but according to other embodiments, the magnified portion may be changed in a unit of words.

Figure 5A:
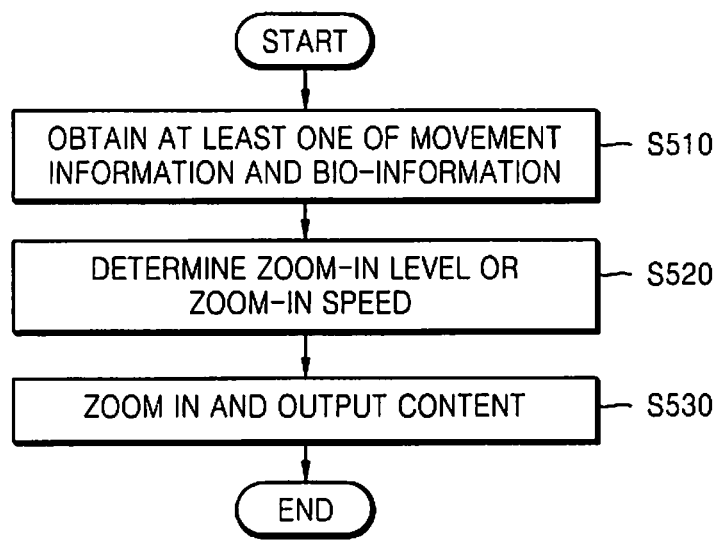
FIGS. 5A through 5C illustrate a method of providing content to a moving user, according to another embodiment of the present invention.
Figure 5B:
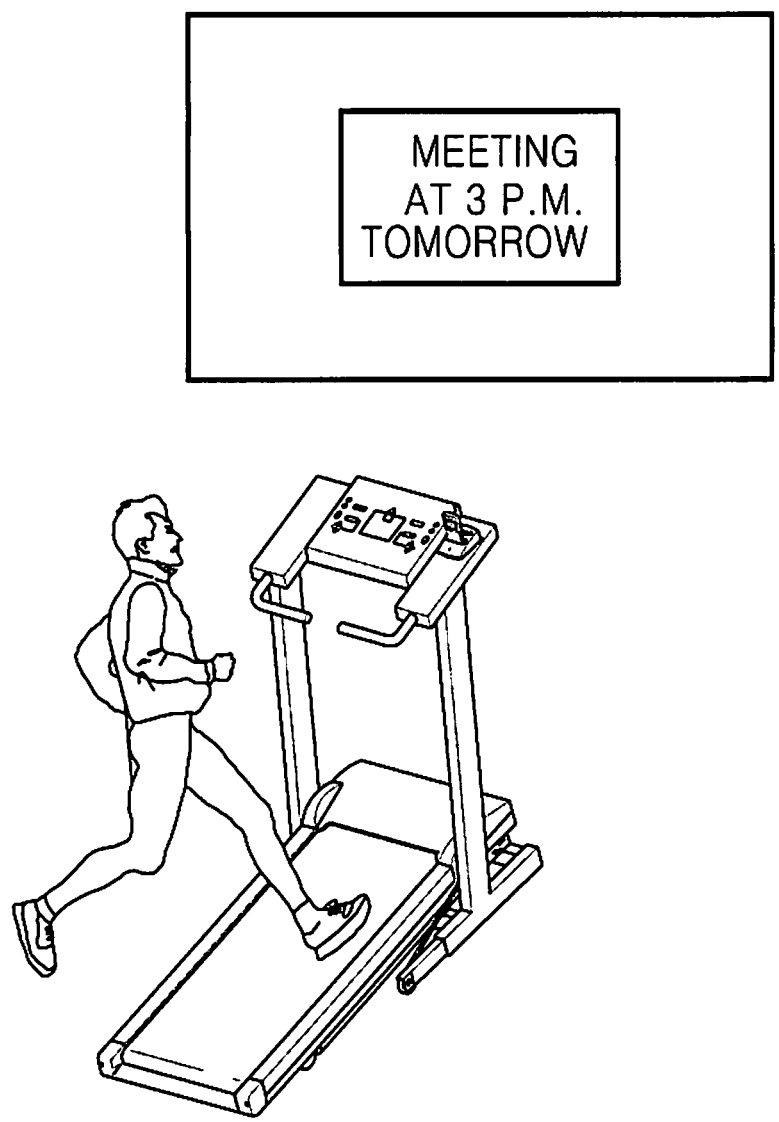
Figure 5C:

FIGS. 5A through 5C illustrate a method of providing content to a moving user, according to another embodiment of the present invention. According to the method described with reference to FIGS. 5A through 5C, the content is gradually zoomed in and output. The present embodiment may be particularly appropriate for providing content in a slide form, like a presentation generated with Microsoft PowerPoint.

FIG. 5A is a flowchart illustrating the method of providing content, according to an embodiment of the present invention.

In step S510, at least one of movement information and bio-information is obtained.

In step S520, a level or a speed at which content is zoomed-in is determined. In order to determine zoomed-in information, or zoom-in speed, the movement information and the bio-information may be used. For example, it is possible to allow that a size of content output when the user runs at a faster speed of 10 km/h is larger than a size of content output when the user runs at a slower speed of 5 km/h. In another example, it is possible to set the content zoom-in speed to a fast value for a slow runner and a slow value for fast runner for a more realistic feel.

In step S530, the content is zoomed-in and output.

FIGS. 5B and 5C illustrate a display device for providing the content according to the method that is described with reference to FIG. 5A. FIG. 5B illustrates the screen of the display device when the user runs at a slower speed of 5 km/h, and FIG. 5C illustrates the screen of the display device when the user runs at a speed of 10 km/h. The level by which text data is zoomed in is adjusted in such a manner that the text data for a fast runner looks larger than the text data for a slow runner.

Figure 6A:
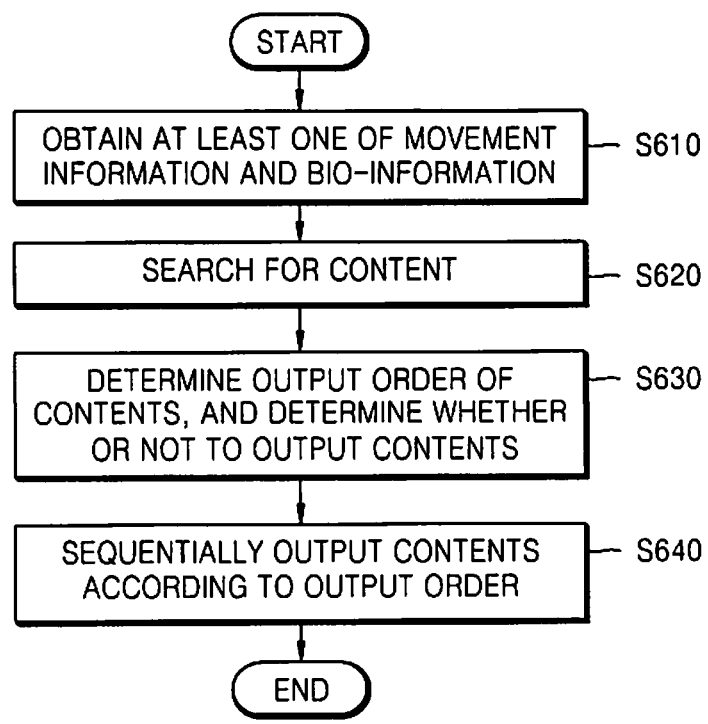
FIGS. 6A through 6C illustrate a method of providing content to a moving user, according to another embodiment of the present invention.
Figure 6B:
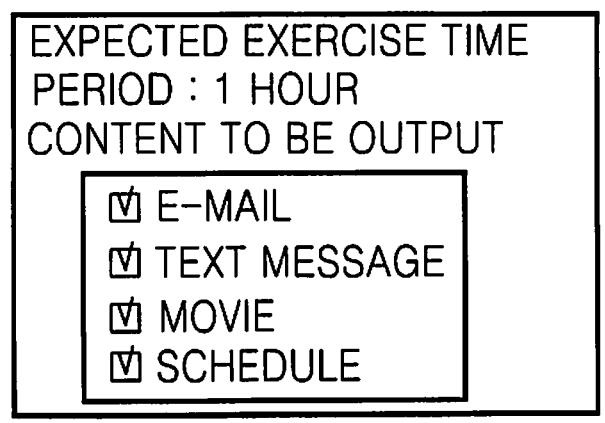
Figure 6B:
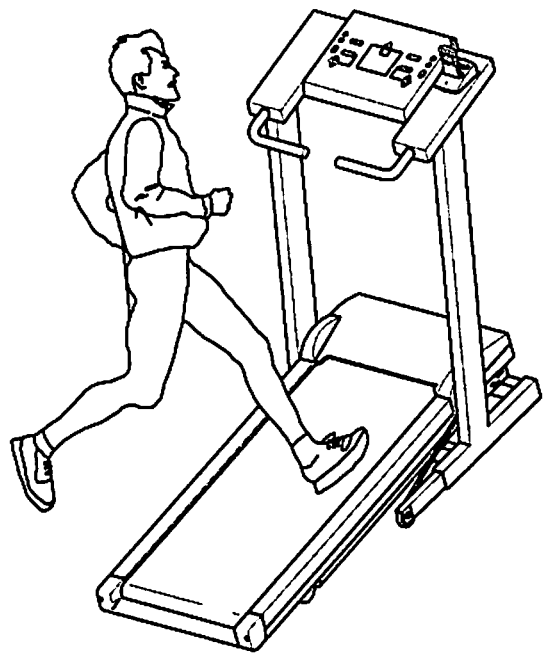
Figure 6C:
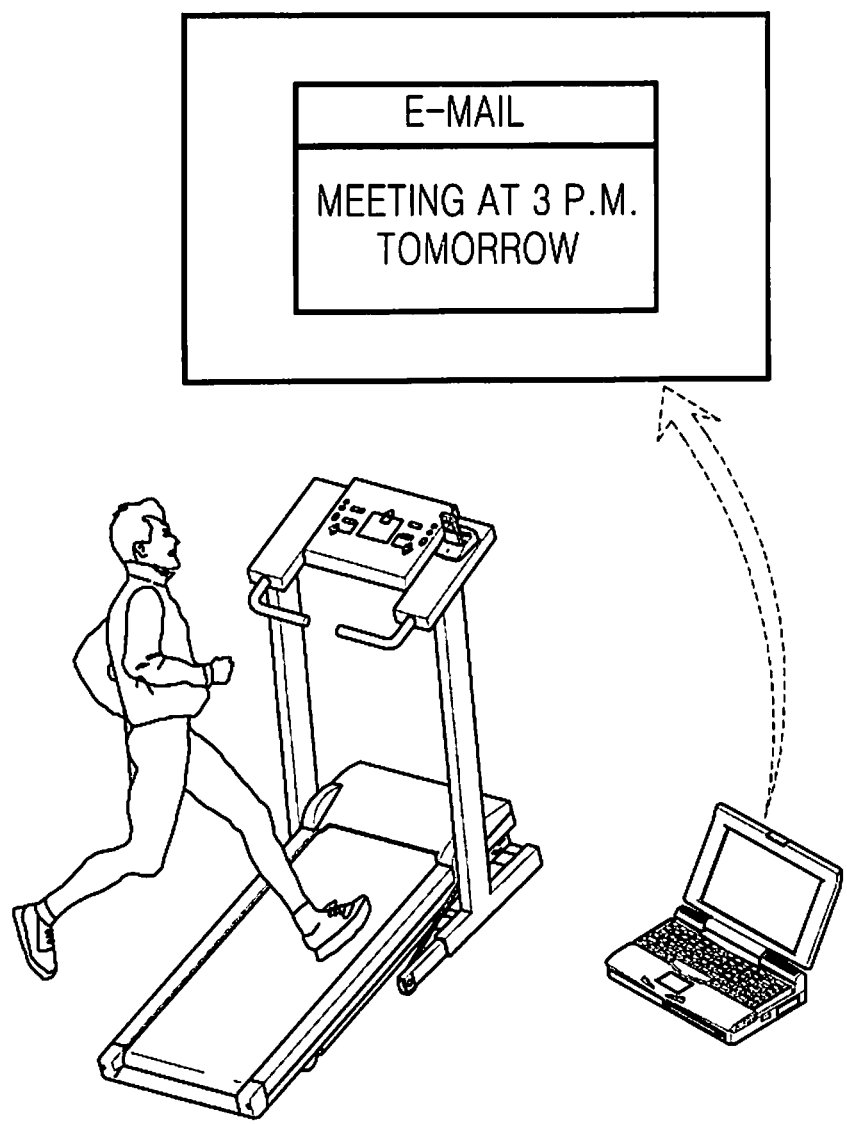

FIGS. 6A through 6C illustrate a method of providing content to a moving user, according to another embodiment of the present invention. According to the method described with reference to FIGS. 6A through 6C, content stored in at least one connected device is selectively output based on movement information and bio-information.

FIG. 6A is a flowchart of the method of providing content, according to an embodiment of the present invention.

In step S610, at least one of the movement information and bio-information is obtained.

In step S620, a plurality of pieces of content, which are internally stored or are stored in one or more devices connected via a network, are searched for.

In step S630, the output order and whether or not to output the plurality of pieces of found content are determined. The output order, and whether to output the content may be determined based on movement information and/or bio-information. For example, in a case where the user performs a dynamic exercise such as running, urgent content including email or a text messages that have not been checked by the user, or content including entertainment shows or music that are easily understood by the user may be output. On the other hand, in a case where the user performs a static exercise such as weight lifting, all types of content may be output according to a determined order, regardless of the type of the contents.

In step S640, the content is sequentially output according to the output order. When the content is output, one of the methods described with reference to FIGS. 2A through 6C may be used.

FIGS. 6B and 6C illustrate an example of data that is provided according to the method of FIG. 6A. FIG. 6B illustrates a process in which content is searched for in connected devices. FIG. 6C illustrates a process in which an e-mail, which is one of the found content, is output. When the e-mail is output, the method of FIG. 2A is used.

The method of providing content to the moving user is not limited to the embodiments of FIGS. 2A through 6C, and thus any content providing method for allowing the moving user to easily interpret the content may be used.

Figure 7:
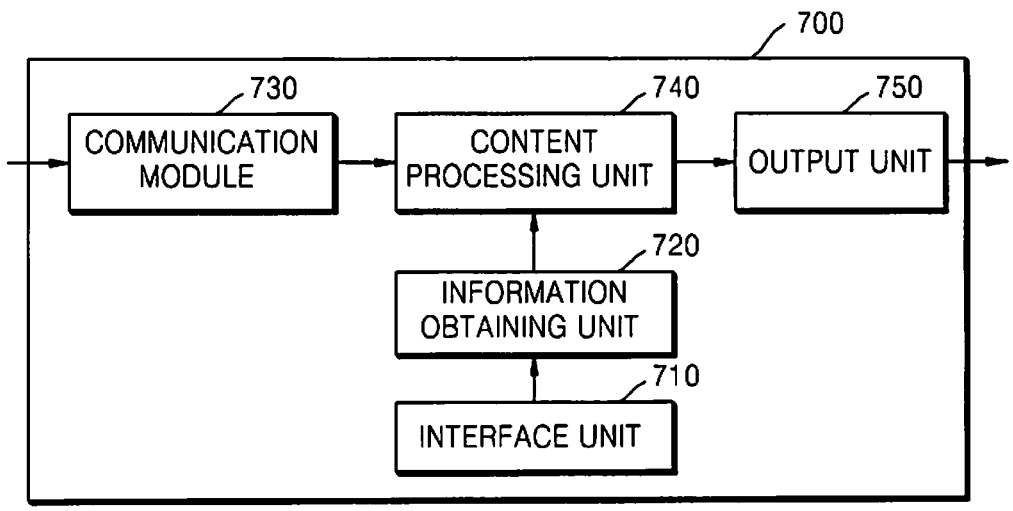
FIG. 7 is a block diagram illustrating a content providing apparatus according to another embodiment of the present invention.

FIG. 7 is a block diagram illustrating a content providing apparatus 700 according to another embodiment of the present invention.

The content providing apparatus 700 includes an interface unit 710, an information obtaining unit 720, a communication module 730, a content processing unit 740, and an output unit 750.

The interface unit 710 receives a signal for selecting content to be output or for selecting a type of content. The interface unit 710 may receive the selection signal via a button attached to a remote control or the content providing apparatus 700.

The communication module 730 receives the selected content or the selected type of content from one or more devices connected via a network. The communication module 730 may receive content via a wired network including a local area network (LAN) or a wireless network including a high speed downlink packet access (HSDPA) network, a wireless local area network (WLAN), and the like.

The information obtaining unit 720 obtains at least one of movement information and bio-information about the user. The information obtaining unit 720 may obtain movement information and/or bio-information about the user from a sensor, or may obtain movement information or bio-information at a previous time from a memory unit (not shown).

The content processing unit 740 processes the content based on the movement information and/or bio-information so as to allow the user to easily understand the content.

The output unit 750 outputs the processed content to an external output device (not shown) such as a display device or a speaker.

Figure 8:
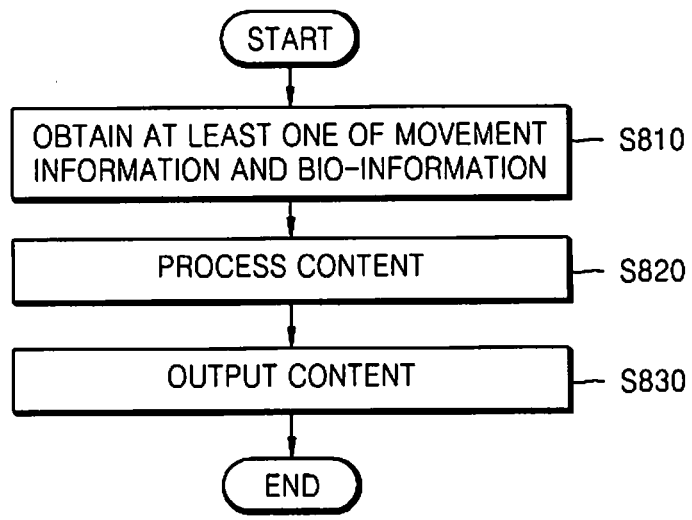
FIG. 8 is a flowchart illustrating a method of providing content, according to another embodiment of the present invention.

FIG. 8 is a flowchart of a method of providing content, according to another embodiment of the present invention.

In step S810, movement information or bio-information about a user is obtained. The movement information may include speed, direction, or a type of movement. The bio-information may include a physical state of the user, e.g., an electrocardiogram, a brain wave, a stress index, a bone density index, a body mass index, the amount of calorie consumption, or body age.

In step S820, the content is processed based on at least one of the movement information and bio-information. In step S820, only essential data from among a plurality of pieces of data configuring the content may be magnified and output; the content may be divided into a plurality of pieces of block data, which in turn may be magnified and output; a portion of the content may be magnified and then output, and here, the content may be processed and output in such a manner that a magnified portion is sequentially changed; or the content may be gradually zoomed in and output.

In step S830, the processed content is output.

Figure 9:
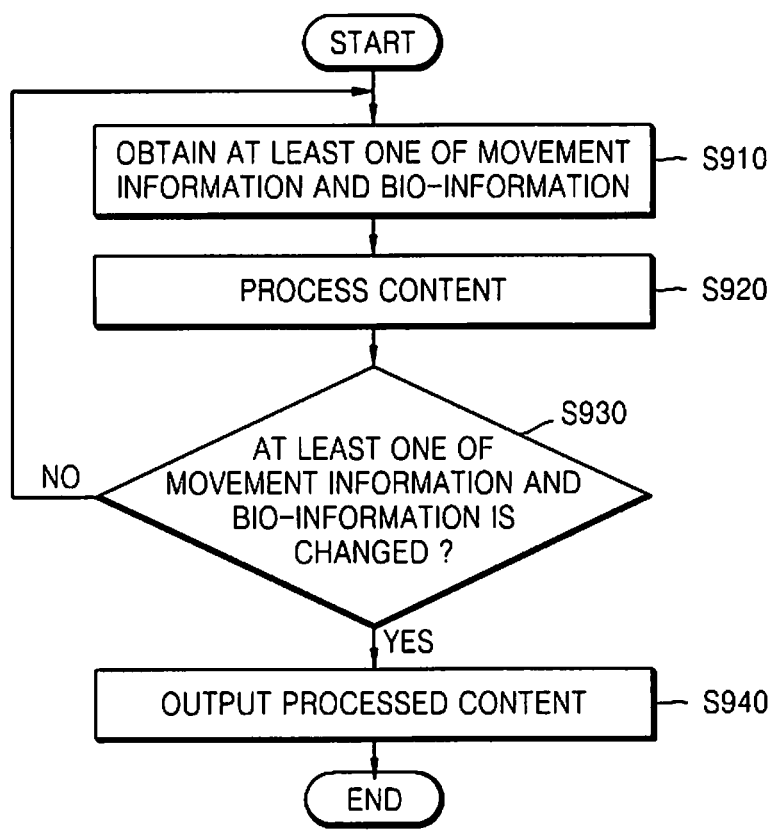
FIG. 9 is a flowchart illustrating a method of providing content, according to another embodiment of the present invention.

FIG. 9 is a flowchart illustrating a method of providing content, according to another embodiment of the present invention.

In step S910, at least one of movement information and bio-information about a user is obtained.

In step S920, the content is processed based on the movement information and/or bio-information In step S930, it is determined whether the movement information or the bio-information has changed. If either has changed, step S910 is performed so that updated information is obtained. Otherwise, if the movement information and the bio-information have not changed, step S940 is performed.

In step S940, the processed content is output.

Embodiments of the present invention can be written as computer programs and can be implemented in general-use digital computers that execute the programs using a non-transitory computer readable recording medium. Examples of the computer readable recording medium include magnetic storage media (e.g., ROM, floppy disks, hard disks, etc.), optical recording media (e.g., CD-ROMs, or DVDs), etc.

While the present invention has been particularly shown and described with reference to certain embodiments thereof, it will be understood by those of ordinary skill in the art that various changes in form and detail may be made therein without departing from the spirit and scope of the present invention as defined by the following claims.

What is claimed is:

1. A method of providing content to a user that is moving, comprising:
    obtaining at least one of movement information about the user and bio-information about the user;
    processing, by a processor, content based on the at least one of the movement information and the bio-information; and
    outputting the processed content,
    wherein processing the content comprises magnifying a portion of the content according to a magnification based on the at least one of the movement information and the bio-information.

2. The method of claim 1, wherein the movement information comprises a speed of movement, a direction of the movement, or a type of movement.

3. The method of claim 1, wherein the bio-information comprises an electrocardiogram, a brain wave, a stress index, a bone density index, a body mass index, the amount of calorie consumption, or user's age.

4. The method of claim 1, wherein the processing comprises:
    extracting a keyword from text data of the content; and
    determining a magnification ratio for the keyword based on at least one of the movement information and the bio-information, and magnifying the keyword according to the magnification ratio.

5. The method of claim 1, wherein the processing comprises:
    dividing text data of the content into a plurality of pieces of block data; and
    determining a magnification ratio for each of the plurality of pieces of block data based on the at least one of the movement information and the bio-information, and magnifying each of the plurality of pieces of block data according to the magnification ratio.

6. The method of claim 1, wherein the processing comprises sequentially magnifying one or more letters in text data of the content, based on the movement information or the bio-information.

7. The method of claim 1, wherein the processing comprises determining a speed or a level at which the content is zoomed in, based on the at least one of the movement information and the bio-information.

8. The method of claim 1, wherein the processing comprises searching for content in one or more connected devices.

9. The method of claim 1, wherein the processing comprises:
    selecting a plurality of pieces of content to be output from among content stored in one or more connected devices, based on the at least one of the movement information and the bio-information; and
    controlling the plurality of pieces of selected content to be sequentially output.

10. The method of claim 1, further comprising receiving an external signal for determining a type of content to be output and a processing scheme for the content.

11. A content providing apparatus for providing content to a user that is moving, comprising:
- an information obtaining unit for obtaining at least one of movement information about the user and bio-information about the user;
- a content processing unit for processing content based on at least one of the movement information and the bio-information; and
- an output unit for outputting the processed content,
- wherein the content processing unit magnifies a portion of the content according to a magnification ratio determined based on the at least one of the movement information and the bio-information.

12. The content providing apparatus of claim 11, wherein the movement information comprises a speed of movement, a direction of the movement, or a type of movement.

13. The content providing apparatus of claim 11, wherein the bio-information comprises an electrocardiogram, a brain wave, a stress index, a bone density index, a body mass index, the amount of calorie consumption, or user's age.

14. The content providing apparatus of claim 11, wherein the content processing unit extracts a keyword from text data of the content, and magnifies the keyword based on at least one of the movement information and the bio-information.

15. The content providing apparatus of claim 11, wherein the content processing unit divides text data of the content into a plurality of pieces of block data, determines a magnification ratio of each of the plurality of pieces of block data based on the at least one of the movement information and bio-information, and magnifies the plurality of pieces of block data according to the magnification ratio.

16. The content providing apparatus of claim 11, wherein the content processing unit sequentially magnifies one or more letters in text data of the content based on at least one of the movement information and the bio-information.

17. The content providing apparatus of claim 11, wherein the content processing unit determines a speed or a level at which the content is zoomed in, based on at least one of the movement information and the bio-information.

18. The content providing apparatus of claim 11, wherein the content processing unit searches for content in one or more connected devices.

19. The content providing apparatus of claim 11, wherein the content processing unit selects content to be output from among a plurality of pieces of content stored in one or more connected devices, based on at least one of the movement information and the bio-information.

* * * * *